Aug. 27, 1935.  J. W. BROWN  2,012,586
RECEPTACLE CLOSURE
Filed March 18, 1935
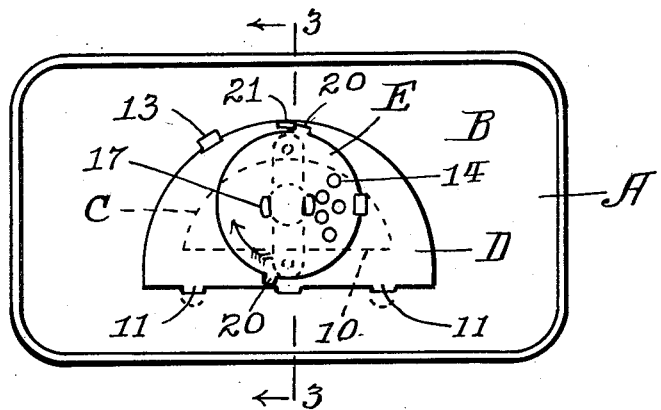
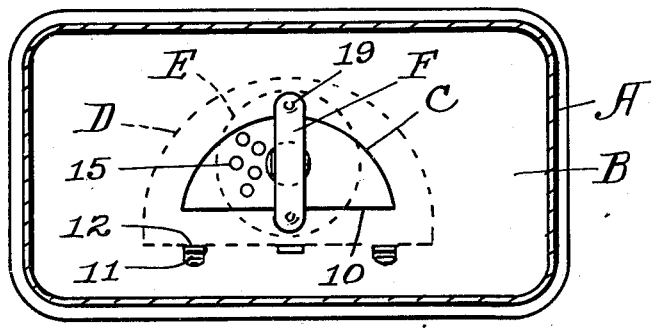
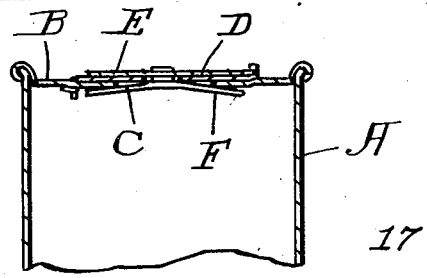
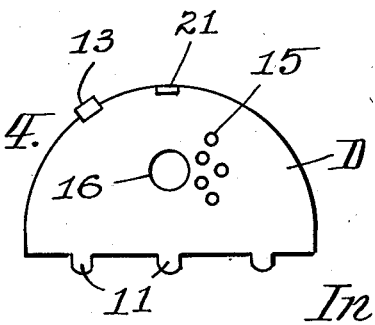
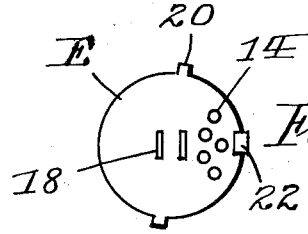
Inventor:
James W. Brown,
by: Attorney.

Patented Aug. 27, 1935

2,012,586

UNITED STATES PATENT OFFICE 2,012,586

RECEPTACLE CLOSURE

James W. Brown, Los Angeles, Calif., assignor to Coffee Products of America Inc. Ltd., Los Angeles, Calif., a corporation of Delaware Application March 18, 1935, Serial No. 11,676

4 Claims. (Cl. 221—64)

My invention relates to receptacle closures, the primary object being to provide means by the use of which the contents of a receptacle can be readily removed by the user either in bulk or finely divided condition. Modern methods of distribution and keen competition require the manufacturer and producer of condiments, such as spices, salt, pepper and any other products in finely divided condition, to provide the user with the most convenient, attractive and economical package and methods of dispensing and it is one of the objects of my invention to provide a receptacle which will hold the contents tightly from waste and deterioration and which will upon delivery enable the user to easily remove the contents when and as desired, either in bulk by the use of a spoon or other implement or in finely divided condition by sprinkling. Among further objects is to provide a closure for receptacles of the general type above indicated which is easy to operate and which is effective in use and not liable to disorder. A further object is to provide a closure which will perform the functions above stated and of combined form whereby through the operation of a single instrumentality the device can in one position be tightly and securely closed, in another position adjusted so that the contents of the receptacle can be sprinkled therefrom, and in a third position, opened so that a spoon or other implement can be inserted and the contents removed in bulk condition. Still further objects will be apparent from the following description and accompanying drawing forming part of this specification.

In the drawing, Figure 1 is a plan looking at the end of a receptacle to which my improvement is applied; Fig. 2 is a cross section of the receptacle shown in Fig. 1, looking outwardly at the end wall shown in Fig. 1; Fig. 3 is a section taken on the line 3—3 of Fig. 1; Fig. 4 is a plan of the spoon opening closure plate removed from the receptacle; Fig. 5 is a plan of the sprinkler disc removed from the closure plate, and Fig. 6 is a perspective view of the spring catch removed from the closure plate and sprinkler control disc.

In the drawing, A indicates a container which may be of any suitable shape and made out of any suitable material desired. As shown it is of oblong shape and made out of thin sheet metal resembling the usual spice can which is in common use. It has been customary to provide one end of the receptacle with a cover but this is an added expense and when used it has been necessary to remove same if the user desired to remove any of the contents of the receptacle with resultant spilling and wasting of part of the contents. The use of a cover is not necessary with my invention, the end on which the cover has been employed being closed by an end wall sealed to the body of the receptacle and when desired my improvement can be incorporated either into part of the end or other wall of the receptacle or into said cover in which event the latter constitutes an end wall or other wall within the meaning of the following description and claims. As shown, B is an end wall of the receptacle into which my improvement is incorporated, having an opening C therein, through which a spoon or other implement can be inserted to remove the contents of the receptacle in bulk. Preferably, although not necessarily within the spirit of my invention, this spoon opening resembles the configuration of the marginal outline of a cross section of a spoon and of a size slightly larger to freely admit a table or other spoon. One portion 10 of the margin of this opening is a straight edge which enables the user to level or even the contents of the spoon as the latter is withdrawn from the receptacle, thus assuring an even spoon full being removed and reducing the tendency of the contents of the spoon from spilling and becoming wasted.

D indicates a spoon opening closure which is a thin plate of any suitable material and shape, that disclosed conforming with the outline of the spoon opening but larger so as to over-lap the margin of the opening and thus provide a tight cover on the outer surface of the end wall. Small protuberances 11 from the straight edge of the closure plate, struck downwardly and inserted through openings 12 in the end wall of the receptacle and bent thereunder provide a hinge connection whereby the closure can be swung outwardly into open position or inwardly to close the spoon opening. A small thumb or finger engaging lug 13 on the curved edge of the closure assists the user in swinging the latter.

Arranged on the closure plate above the spoon opening in the receptacle is a movable sprinkler control and catch, the function of which is to open and close perforations through which the contents of the receptacle can be sprinkled and to release or secure the closure closed under spring pressure. This sprinkler control and catch consists of a thin disc E swiveled on the outer surface of the closure plate and provided with sprinkler perforations 14 which coincide with perforations through the closure in one rotative position of the disc, (see Fig. 1) to provide passages through which the contents of the receptacle can be sprinkled. The sprinkler perforations in the closure plate are indicated by 15 in Figs. 2 and 4. Mounted rigidly on the central portion of disc E and swiveled to the closure plate through the circular passage 16 by clips 17 is the spring catch F. This catch resembles a flat spring arm from the median portion of which clips 17 are struck laterally. These clips are inserted through passage 16 in the closure plate and slots 18 in the sprinkler perforation control disc E and their ends are bent into tight engagement with the disc, thus swiveling the combined control disc and catch in said passage and on the closure plate. When the control disc is turned into a position with perforations 14 and 15 registering, the catch engages the opposite marginal portions of spoon opening C under spring pressure and detentures 19 in the opposite ends of the catch more securely engage the end wall of the receptacle and assist in holding the disc from unintentional rotation. A quarter turn of the control disc in the direction of the arrow shown in Fig. 1 closes the sprinkler perforations, disengages the catch from the end wall of the receptacle and allows the closure plate to swing outwardly and open the spoon receiving passage C. Continued rotation of the disc substantially another quarter revolution in the same direction causes the catch to again engage the marginal portion of the end wall surrounding opening C during which period the sprinkler perforations in the closure plate are closed by the disc.

The control disc E has a pair of oppositely disposed shoulders 20 radiating from its periphery and the closure plate D has a stop 21 struck from its curved rim in the path of said shoulders. Thus the disc is limited to a stroke of substantially one-half revolution, at one end of which the sprinkler perforations are opened and at the other end closed, and at both ends of which the closure plate is held closed under spring pressure. At the median portion of said stroke the catch is disengaged from the end wall of the receptacle and the closure plate is free to be swung outwardly into open position. A thumb or finger engaging shoulder 22 on the marginal portion of the control disc enables the user to more readily turn and operate the disc and cause the catch and sprinkler perforations to function. It should be noted that the spoon receiving passage C is an elongated opening and that the length of spring catch F more than equals the width and is less than the length thereof. Therefore said opening can be of any suitable elongated shape within the spirit of my invention. The particular shape shown, having the straight edge 10, however, has the advantage of enabling the user to level each spoon full of ingredients removed from the receptacle for more accurately measuring the same and preventing waste.

In accordance with the patent statutes, I have described the principles of operation of my invention, together with the construction thereof which I now consider to represent the best embodiment thereof, but I desire to have it understood that the structure shown is only illustrative and that the invention can be carried out by other means and applied to uses other than those above set forth within the scope of the following claims.

Having described my invention, what I claim as new and desire to secure by Letters Patent is:

1. A receptacle having an opening in one of its walls through which an implement can be inserted to remove ingredients from within, a closure plate over said opening hinged to said wall and adapted to swing outwardly and expose said opening, and a disc element swiveled on the surface of said plate having a catch on the back of said plate adapted to pass freely through said opening when the plate is closed and, when turned by said disc to engage below the margin of said opening and hold the closure plate closed, said closure plate and disc having perforations which are adapted to coincide in one position of the disc when said plate is held closed over said opening by said catch.

2. A receptacle having an elongated opening in one of its walls through which an implement can be inserted to remove ingredients from within, a closure plate over said opening hinged to said wall and adapted to swing outwardly and expose said opening, and a disc element swiveled on the surface of said plate having a transverse catch bar rigidly attached thereto on the back of said plate and of such length as to pass freely through said opening when disposed lengthwise thereof as the plate is closed and when turned by said disc to engage across and below the margin of said opening and hold the closure plate closed, said closure plate and disc having perforations which are adapted to coincide in one position of the disc when said plate is held closed over said opening by said catch bar.

3. A receptacle having an elongated opening in one of its walls through which an implement can be inserted to remove ingredients from within, a closure plate over said opening hinged to said wall and adapted to swing outwardly and expose said opening, and a disc element swiveled on the surface of said plate having a resilient catch attached thereto on the back of said plate and of such length as to pass freely through said opening when disposed lengthwise thereof and when the plate is closed, and to engage across and below the margin of the narrow portion of said opening and hold the closure plate closed tightly under spring pressure when the disc is turned, said closure plate and disc having perforations which are adapted to coincide in one rotative position of the disc while said plate is held closed over said opening by said catch and which are adapted to close in another rotative position of the disc and while said plate remains closed.

4. A receptacle having one of its walls provided with an elongated spoon receiving opening, a portion of said opening being bounded by a straight edge for removing surplus ingredients from the bowl of a spoon as the latter is withdrawn from within the receptacle, a closure plate hinged on said wall and adapted to close said opening, and a combined sprinkler control and catch comprising a disc element on the outer surface and a resilient catch on the back of said plate, said disc and catch being swiveled on the plate, and having sprinkler perforations adapted to coincide in one rotative position of the disc, and said resilient catch being adapted to engage the wall of said receptacle below said straight edge and the marginal portion of said opening opposite said straight edge and hold the closure plate closed over said opening under spring pressure.

JAMES W. BROWN.